(12) United States Patent
Tao et al.

(10) Patent No.: US 10,250,907 B2
(45) Date of Patent: Apr. 2, 2019

(54) INTRA-FRAME PIXEL PREDICTION METHOD, ENCODING METHOD AND DECODING METHOD, AND DEVICE THEREOF

(71) Applicant: Tsinghua University, Beijing (CN)

(72) Inventors: Pin Tao, Beijing (CN); Lixin Feng, Beijing (CN)

(73) Assignee: Tsinghua University, Beijing (CN)

( * ) Notice: Subject to any disclaimer, the term of this patent is extended or adjusted under 35 U.S.C. 154(b) by 118 days.

(21) Appl. No.: 15/326,882

(22) PCT Filed: Jan. 4, 2015

(86) PCT No.: PCT/CN2015/070029
§ 371 (c)(1),
(2) Date: Apr. 13, 2017

(87) PCT Pub. No.: WO2016/008284
PCT Pub. Date: Jan. 21, 2016

(65) Prior Publication Data
US 2017/0223378 A1    Aug. 3, 2017

(30) Foreign Application Priority Data

Jul. 18, 2014    (CN) .......................... 2014 1 0342538

(51) Int. Cl.
*H04N 19/593*    (2014.01)
*H04N 19/61*    (2014.01)
(Continued)

(52) U.S. Cl.
CPC ........... *H04N 19/593* (2014.11); *H04N 19/56* (2014.11); *H04N 19/61* (2014.11); *H04N 19/88* (2014.11)

(58) Field of Classification Search
CPC ........ H04N 19/61; H04N 19/56; H04N 19/88; H04N 19/593
See application file for complete search history.

(56) References Cited

U.S. PATENT DOCUMENTS

2009/0003443 A1* 1/2009 Guo ..................... H04N 19/176
375/240.13
2010/0246675 A1* 9/2010 Gharavi-Alkhansari ...................
H04N 19/105
375/240.13

FOREIGN PATENT DOCUMENTS

CN    101682784 A    3/2010
CN    101715135 A    5/2010
(Continued)

OTHER PUBLICATIONS

International Search Report and Written Opinion for PCT/CN2015/070029 dated Aug. 3, 2015.
(Continued)

*Primary Examiner* — Zhihan Zhou
(74) *Attorney, Agent, or Firm* — Olive Law Group, PLLC

(57) ABSTRACT

Provided are an intra-frame pixel prediction method, encoding method and decoding method, and an intra-frame pixel prediction device. The intra-frame pixel prediction method comprises: defining a target template of a pixel to be predicted currently; comparing the target template with candidate templates in a search region of the frame, and determining, from the candidate templates, at least one matching template matching the target template; and based on the at least one matching template, determining a prediction value of the pixel to be predicted currently. In the intra-frame pixel prediction method in the embodiments of the present invention, the template matching is conducted by taking a pixel point as a unit, so that a pixel can be predicted accurately.

18 Claims, 10 Drawing Sheets

(51) Int. Cl.
*H04N 19/88* (2014.01)
*H04N 19/56* (2014.01)

(56) References Cited

FOREIGN PATENT DOCUMENTS

| CN | 101854545 A | 10/2010 |
| CN | 102595140 A | 7/2012 |

OTHER PUBLICATIONS

First Office Action issued in counterpart Chinese Application No. 201410342538.0 dated Nov. 29, 2017.

\* cited by examiner

INTRA-FRAME PIXEL PREDICTION METHOD, ENCODING METHOD AND DECODING METHOD, AND DEVICE THEREOF

This application is a 35 USC 371 application of International PCT Patent Application No. PCT/CN2015/070029, filed on Jan. 4, 2015, which claims priority to Chinese Patent Application No. 201410342538.0, filed Jul. 18, 2014; the contents of which are hereby incorporated by reference herein in their entireties.

FIELD OF THE INVENTION

The present invention generally relates to video encoding and decoding, in particular to an intra-frame pixel prediction method, a video encoding method and a video decoding method, and a device.

BACKGROUND OF THE INVENTION

Video compression technology is widely used in various products, such as digital set-top boxes (STB), HDTV decoders, DVD players, digital cameras, network multimedia video applications etc. There are various video encoding methods for compressing digital video content. There are already many video compression standards to standardize the various video encoding methods. Examples of these standards include MPEG-1, MPEG-2 (ITU-T H.262), MPEG-4, ITU-T H.261, ITU-T H.263 and ITU-T H.264.

Video encoding standards such as MPEG standards and the like generally achieve data compression through the use of various encoding techniques such as time and space prediction, transformation and quantification, entropy encoding or the like. Compression in a video encoder typically includes inter-frame prediction and intra-frame prediction to improve encoding efficiency. Inter-frame prediction uses time correlation between images of a video, while intra-frame prediction uses space correlation of pixels in images of a video.

Inter-frame prediction and intra-frame prediction are generally performed for pixel blocks.

For intra-frame prediction, it generally uses pixels already reconstructed to extrapolate blocks to be predicted. For example, as for any one of blocks to be encoded in the current image, it uses surrounding pixels that have been reconstructed to perform an interpolation in a certain direction, and takes the result after interpolation as a prediction block of the block to be encoded. Difference between the block to be encoded and the prediction block serves as a prediction residual, and the prediction residual is encoded after transformation and quantification.

SUMMARY OF THE INVENTION

According to an aspect of the present invention, there is provided with an intra-frame pixel prediction method for predicting a pixel in an image, comprises: a step of defining a target template, for defining a target template of a pixel to be predicted currently; a step of determining a matching template, for comparing the target template with candidate templates in a search region of the frame, and determining, from the candidate templates, at least one matching template matching the target template; and a step of determining a prediction value, determining a prediction value of the pixel to be predicted currently based on the at least one matching template.

According to another aspect of the present invention, there is provided with an encoding method for conducting intra-frame encoding for an image, comprising: a step of defining a target template, for defining a target template of a pixel to be predicted currently; a step of determining a matching template, for comparing the target template with candidate templates in a search region of the frame, and determining, from the candidate templates, at least one matching template matching the target template; and a step of determining a prediction value, for determining a prediction value of the pixel to be predicted currently based on the at least one matching template; and an encoding step, for based on the prediction, encoding the pixel to be predicted currently or the block to which the pixel to be predicted currently belongs based on the prediction value of the pixel to be predicted currently.

According to another aspect of the present invention, there is provided with a decoding method for decoding an image frame, comprising: receiving an encoded representation of an image block, the image block being formed by pixels in an image before being encoded after rearranging pixels and dividing the pixels into blocks; obtaining a prediction block of the image block, comprising conducting prediction for each pixel in the image block by the following steps: determining a target template of the pixel; comparing the target template with candidate templates in a search region of the frame, and determining, from the candidate templates, at least one matching template matching the target template; determining a prediction value of the pixel to be predicted currently based on the at least one matching template, and obtaining respective pixel values of the image block based on a prediction block of the image block and an encoded representation of the image block.

According to another aspect of the present invention, there is provided with an intra-frame pixel prediction device for predicting pixels in an image, comprising: means for defining a target template, for defining a target template of a pixel to be predicted currently; means for determining a matching template, for comparing the target template with candidate templates in a search region of the frame, and determining, from the candidate templates, at least one matching template matching the target template; and means for determining a prediction value, for determining a prediction value of the pixel to be predicted currently based on the at least one matching template. According to another aspect of the present invention, there is provided with a computer-readable medium in which a set of instructions are stored, the instructions, when being executed by a processor, guiding the processor to execute any one of the above mentioned intra-frame pixel prediction method, image encoding method and image decoding method.

The intra-frame pixel prediction method of an embodiment of the present invention conducts template matching by taking a pixel point as a unit, which is very different from traditional intra-frame pixel prediction techniques, while the traditional intra-frame pixel prediction techniques conduct template matching by taking a pixel block as a unit. In the traditional intra-frame pixel prediction techniques, the farther the pixels in a pixel block are away from the template, the lower the prediction accuracy is. In contrast, the intra-frame pixel prediction method of the embodiment of the present invention conducts template matching by taking a pixel point as a unit, and can perform prediction well for all pixels.

Further, the pixel encoding method and decoding method including pixel rearranging technique and intra-frame prediction technique according to embodiments of the present invention make it possible to use the method for conducting intra-frame prediction by taking a pixel as a unit in combination with traditional transformation, quantification and encoding technologies of taking a block as a unit, and the problem of the spread of prediction errors can be overcome or reduced simultaneously.

BRIEF DESCRIPTION OF THE DRAWINGS

From the following detailed description of the embodiments of the present invention in combination with the accompanying drawings, these and/or other aspects and advantages of the present invention will become clearer and more understandable, wherein.

Figure 2:
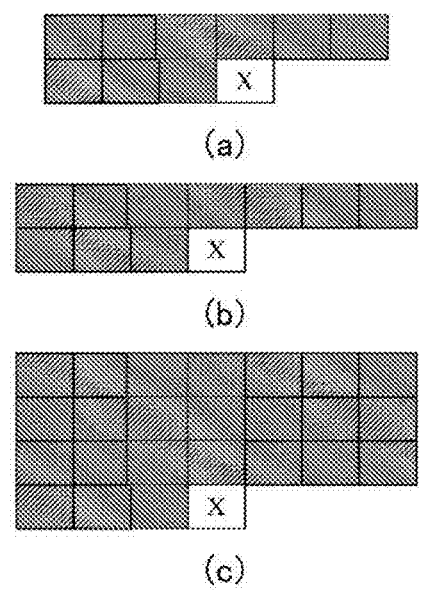
Figure 3:
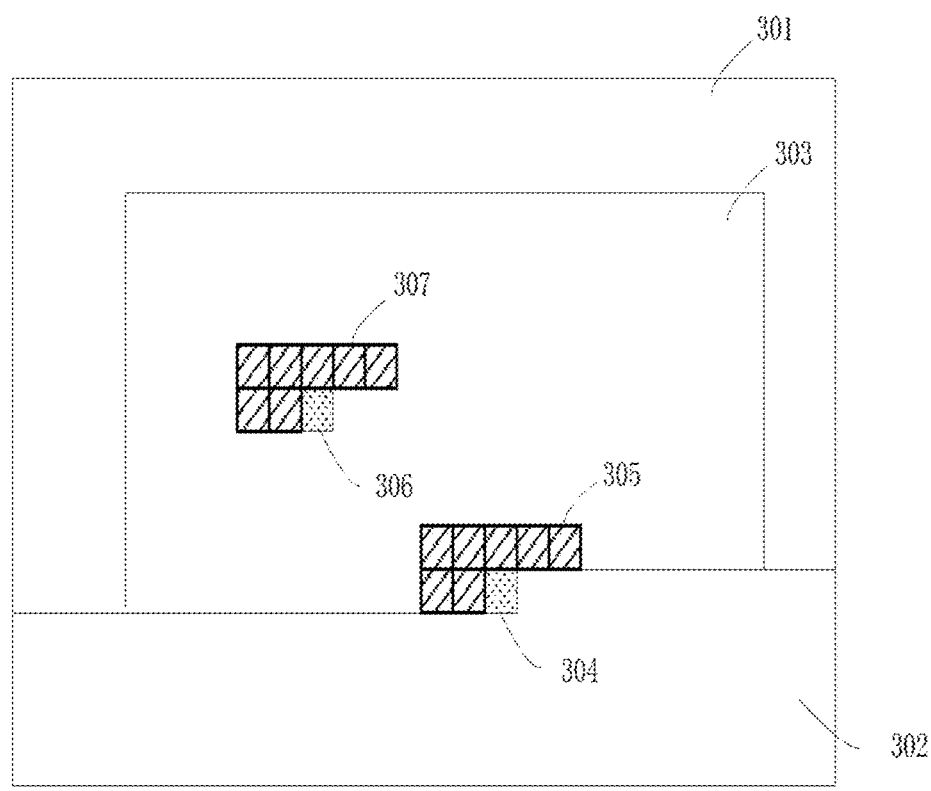
Figure 4:
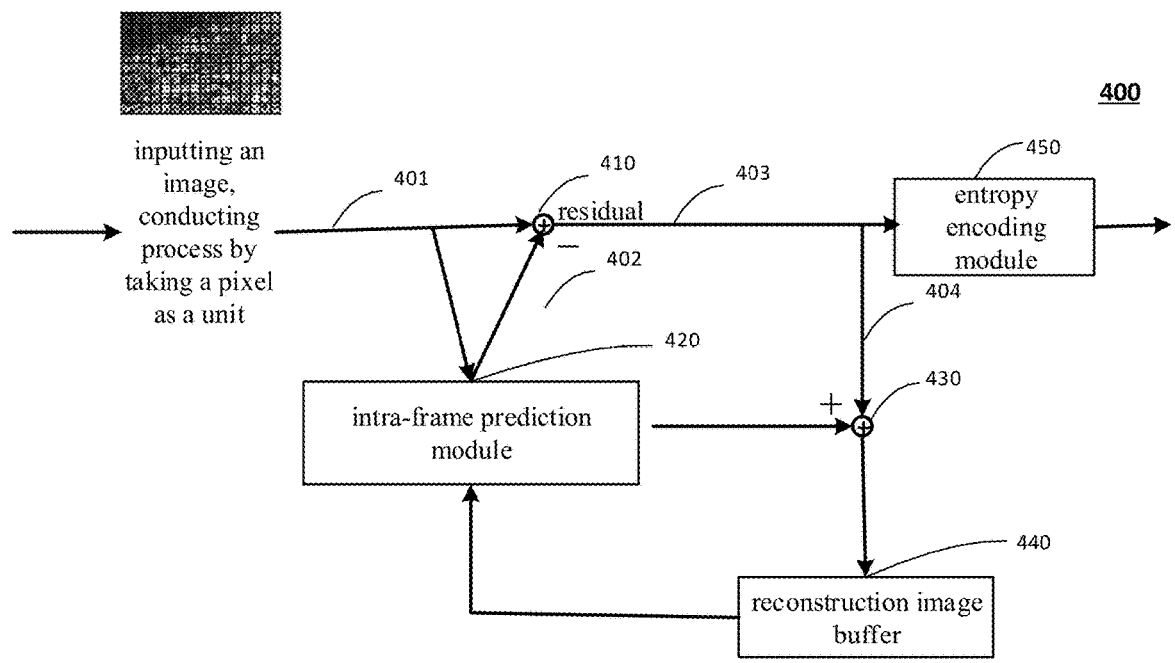
Figure 5:
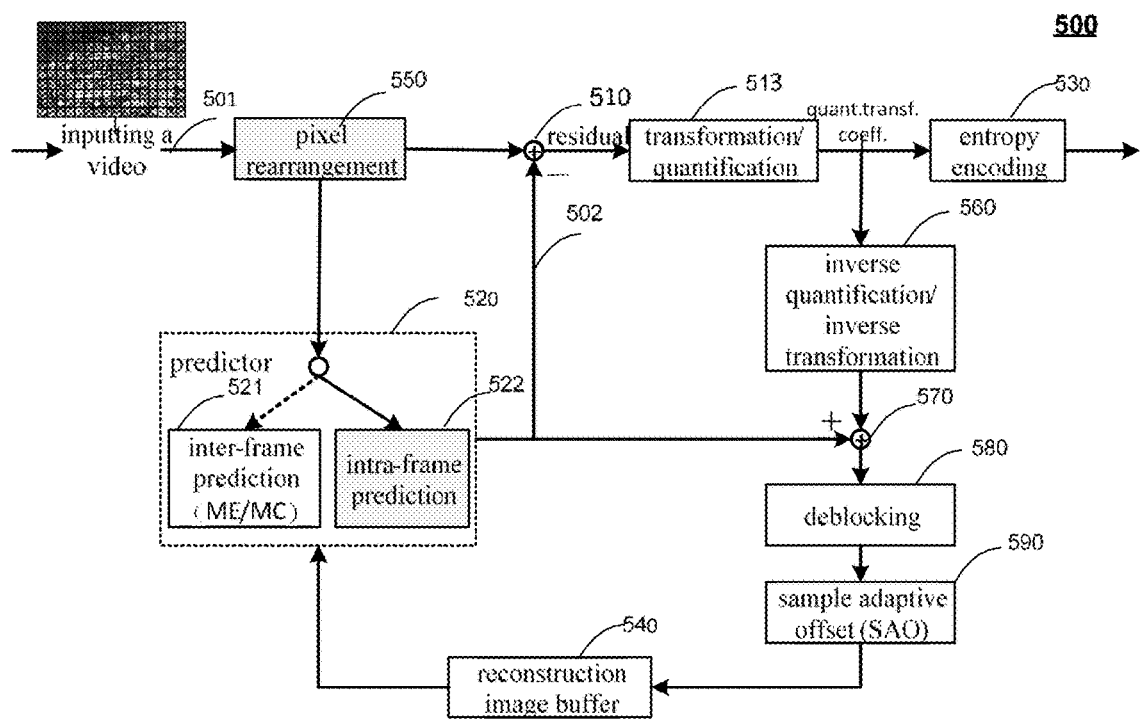
Figure 7:
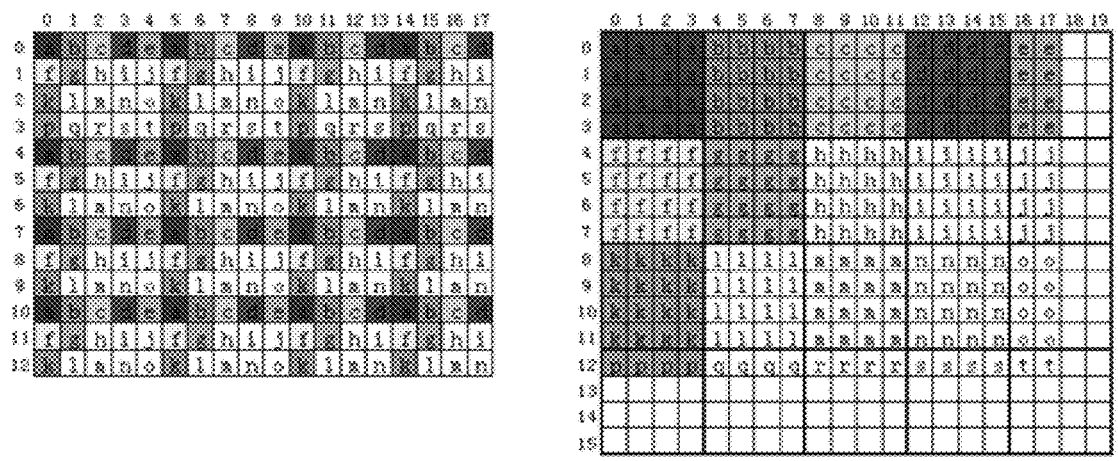
Figure 9:
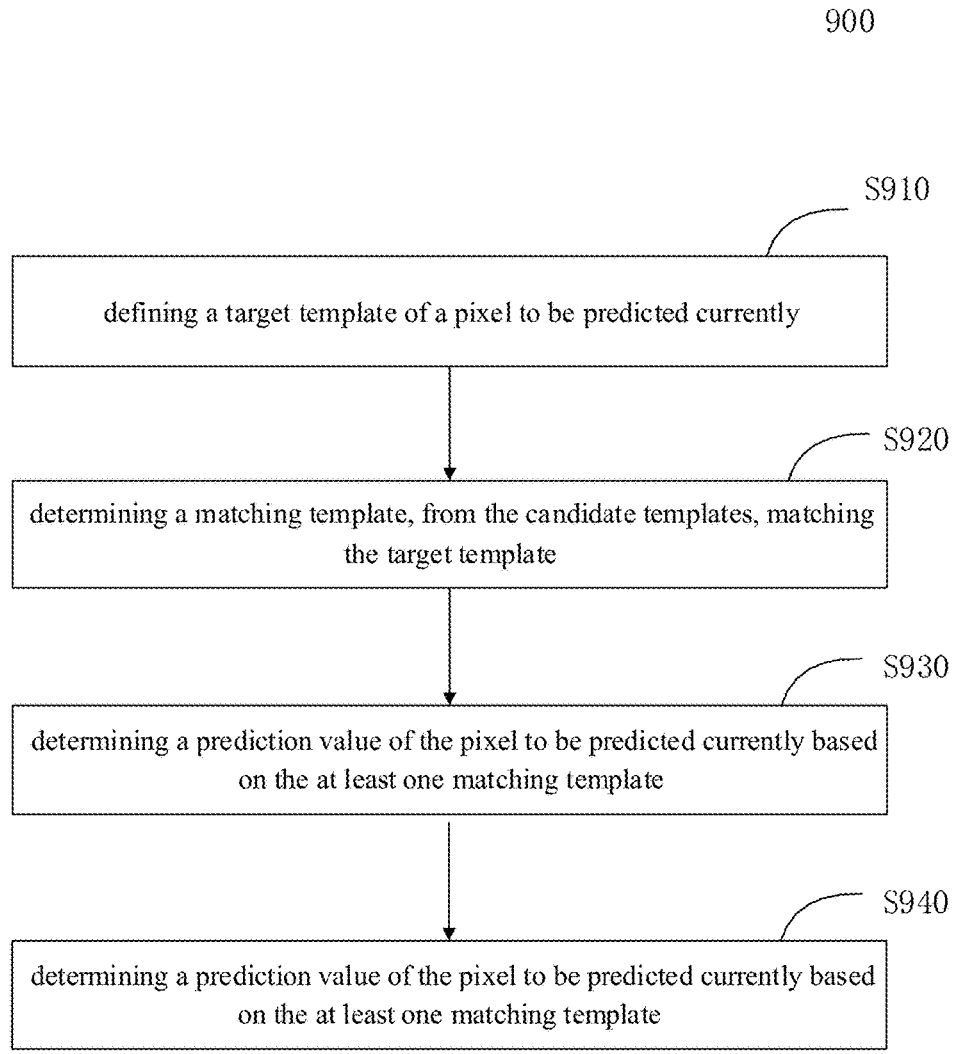
Figure 10:
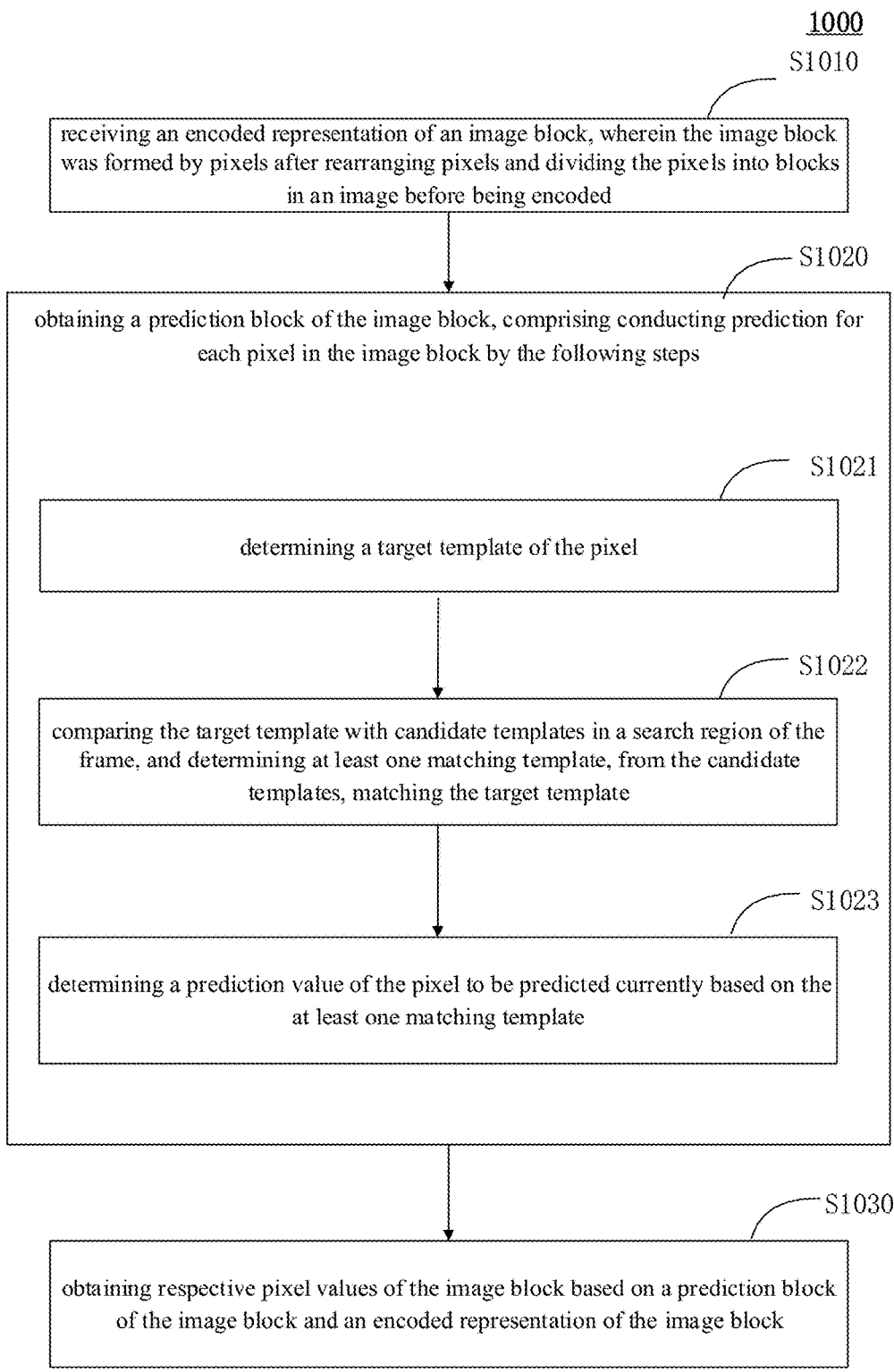

(a), (b) and (c) in FIG. 2 show schematic diagrams of lying L-shaped template examples, wherein the block indicated with "X" denotes a pixel to be predicted, and the respective dark colored blocks on the left side and upper side thereof denote pixels that are used for forming the template thereof;

FIG. 3 shows an exemplary illustrative schematic diagram of intra-frame prediction in an image 300 according to an embodiment of the present invention;

FIG. 4 shows a configuration block diagram of an image encoder 400 according to an embodiment of the present invention;

FIG. 5 shows an exemplary configuration block diagram of an image encoder 500 according to an embodiment of the present invention;

(a) and (b) in FIG. 6 show image examples before and after pixel rearranging;

(a) and (b) of FIG. 7 respectively show image examples before and after pixel rearranging;

(a) and (b) in FIG. 8 show image examples before and after pixel rearranging;

FIG. 9 shows a flow chart of an exemplary image encoding method according to an embodiment of the present invention; and FIG. 10 shows a flow chart of an exemplary decoding method 1000 for image frame decoding according to an embodiment of the present invention.

DETAILED DESCRIPTION OF THE EMBODIMENTS

In order that those skilled in the art can better understand the present invention, a further detailed illustration of the present invention will be given below in combination with the accompany drawings and specific implementations.

Figure 1:
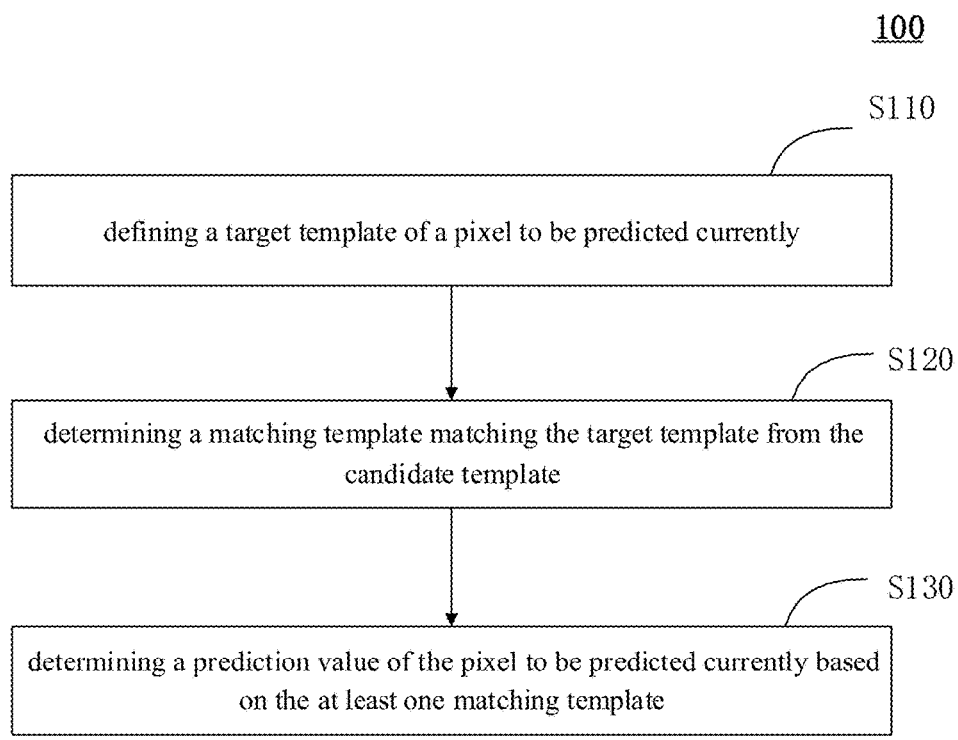
FIG. 1 shows a flow chart of an exemplary intra-frame pixel prediction method 100 according to an embodiment of the present invention.

The description will be made below in the following sequence:
    I. an example of an intra-frame pixel prediction method
    II. a first embodiment of an image encoder
    III. a second embodiment of an image encoder
    IV. an example of a pixel rearranging method
    V. an embodiment of an image encoding method
    VI. an embodiment of an image decoding method
    I. An Example of an Intra-Frame Pixel Prediction Method FIG. 1 shows a flow chart of an exemplary intra-frame pixel prediction method 100 according to an embodiment of the present invention.

In step S110, a target template of a pixel to be predicted currently is defined.

In an example, the target template of the pixel may be formed of reconstructed pixels in a predetermined range around the pixel. Templates of different modes may be constructed according to requirements and/or features of graphics.

For instance, assuming that the scanning direction of pixel encoding is from left to right and from top to bottom, which means that when a pixel is encoded, pixels in the left side and upper side thereof may have been reconstructed, so a lying L-shaped template may be constructed. (a), (b) and (c) in FIG. 2 show schematic diagrams of lying L-shaped template examples, wherein the block indicated with "X" denotes a pixel to be predicted, and the respective dark colored blocks on the left side and upper side thereof denote pixels that are used for forming the template thereof.

In an example, shape and size of a pixel-associated template may be determined according to features of an image. For instance, if most of content of the image are characters, size of the template may be average size of the characters.

If the scanning direction of pixel encoding in an image is from right to left and from bottom to top, template of a pixel may be formed by pixels on the right side and lower side thereof.

In addition, template of a pixel is not limited to the lying L-shaped form, and pattern of the template may be designed according to requirements and image features. It should be noted that, if there are pixels that have not be reconstructed in a template associated with a pixel, the pixels that have not be reconstructed may be marked as invalid points. As for the invalid points, the pixel values thereof may be deemed as 0 later.

It should be noted that the template of a pixel afore is described in a general form. For pixels located at the edge of an image, e.g. a pixel in the top line or the leftmost line of an image, there is no lying L-shaped template. For such a pixel, the prediction value thereof may be directly set as a fixed value, e.g. 128, skipping the target template defining step S110 and the following matching template determining step S120 and prediction value determining step S130.

In step S120, the target template is compared with candidate templates in a search region of the frame, and at least one matching template, from the candidate templates, matching the target template is determined.

In an example, the search region may be whole of the region encoded or reconstructed previously. In another example, the search region may be a part of the region encoded or reconstructed previously, e.g. a part adjacent to the pixel to be predicted in the reconstructed region.

In an example, summation of absolute differences (SAD) of respective corresponding pixels between the target template and the candidate templates may be calculated as a measure of difference between the two, and the candidate template that has a smallest difference from the target template is taken as a matching template. In certain examples, Mean Square Error (MSE) may be taken as the measure of difference. In another example, the measure of difference may further be normalized, e.g. by dividing the summation of absolute differences by number of pixels in the template. Furthermore, in the process of calculating differences between the target template and the candidate templates, as for invalid pixels, e.g. the above mentioned unreconstructed pixels, processing thereof may be skipped, which means that contribution of the invalid pixels is not taken into consideration in the process of calculating differences.

In an example, more than one matching templates may be selected. For instance, 3 candidate templates that have the least difference from the target template may serve as matching templates.

In step S130, a prediction value of the pixel to be predicted currently is determined based on the at least one matching template.

For instance, in an example, according to relative position relationship between the pixel to be predicted currently and the target template thereof, a reference pixel that has the relative position relationship with the matching template is obtained. For instance, in case where there is only one matching template, value of the reference pixel may be taken as a prediction value of the pixel to be predicted currently. For another instance, in case of selecting a plurality of matching templates, respective corresponding reference pixels may be obtained and for example average value of the plurality of reference pixels is acquired to serve as the prediction value of the pixel to be predicted currently. Moreover, different weights may be given to the respective reference pixels; for instance, an associated reference pixel of the matching template that has a highest matching degree with the target template is given with the highest weight so that it has the greatest contribution in process of calculating the prediction value of the pixel to be predicted.

In the examples above, the prediction value of the pixel to be predicted is determined merely based on the reference pixels. In certain other examples, the prediction value of the pixel to be predicted may be calculated based on both of the matching templates and the reference pixels. For instance, average value of all the pixels that form the matching template and the reference pixels may be calculated to serve as the prediction value of the pixel to be predicted. Similarly, in the process of calculating the average value, different pixels may be given with different weights. For instance, weights may be given based on distances from the reference pixels. The smaller the distance from the reference pixels is, the higher the weight is; in contrast, the greater the distance from the reference pixels is, the lower the weight is.

In the intra-frame pixel prediction method according to the embodiment of the present invention, template matching is conducted by taking a pixel point as a unit, which is very different from traditional intra-frame pixel prediction techniques in which template matching is conducted by taking a pixel block as a unit. In the traditional intra-frame pixel prediction techniques, the greater the distance of a pixel in the pixel block from the template, the lower the accuracy of the prediction is. To the contrast, in the intra-frame pixel prediction method according to the embodiment of the present invention, template matching is conducted by taking a pixel point as a unit, and all the pixels can be predicted well.

The intra-frame pixel prediction method according to the embodiment of the present invention is especially suitable for a Screen Content image. The Screen Content image means a screen picture displayed in the display of a desktop computer, a tablet computer or a mobile telephone or the like. The Screen Content image has some characteristics relative to images taken by normal cameras: firstly, the Screen Content image includes a plurality of similar points in a picture, for the Screen Content is exported from a processing device by application programs, is generally used for describing texts or graphic elements and has fewer colors; secondly, the Screen Content image has no noise; thirdly, the Screen Content image generally includes a plurality of sharp edges, especially in case where there are a large number of texts in the Screen Content; fourthly, the Screen Content image generally has a great size; and fifthly, content in many regions (e.g. non-textual regions) are very smooth.

Traditional intra-frame pixel prediction methods based on pixel blocks are generally directed to images taken by cameras, and are not suitable for the Screen Content image. Furthermore, the greater the distance of pixels in the pixel block from a template is, the lower the accuracy of the prediction is. To the contrast, in the intra-frame pixel prediction method according to the embodiment of the present invention above, template matching is conducted by taking a pixel point as a unit, and the pixels can be predicted better.

FIG. 3 shows an exemplary illustrative schematic diagram of intra-frame prediction in an image 300 according to an embodiment of the present invention. The image 300 may be a concrete image that is being encoded by an encoder (e.g. an encoder 400 shown by following FIG. 4). The image 300 includes a part 300 that has been encoded and reconstructed previously and a part 302 to be encoded. The pixel 304 (shown in a dotted shadow) is a current pixel that is being predicted. The search region 303 is a part of a reconstructed region 301; it is around the pixel 301 to be predicted but does not include the pixel that has not been encoded in the bottom right. The template 305 of the pixel 304 to be predicted (called as target template) is in the upper left of the pixel 304. In such an example, the template 305 includes 7 pixels that have been reconstructed, i.e., 2 pixels in the left side and 5 pixels at the top. The intra-frame prediction for the pixel 304 is conducted by searching for matching template for the template 305 in the search region 303. The candidate template 307 in the search region 303 in the drawing has a pattern the same with that of the target template, and the candidate template 307 has a corresponding reference pixel 306. If the candidate template 307 is found in the search region 303 as matching template of the target template, in an example, the reference pixel 306 may be taken as a prediction value of the pixel 304 to be predicted, while in another example, a certain interpolation operation may be performed for the candidate template 307 and the reference pixel 306 and the interpolation result will be taken as a prediction value of the pixel 304 to be predicted.

II. A First Embodiment of an Image Encoder

FIG. 4 shows a configuration block diagram of an image encoder 400 according to an embodiment of the present invention.

As shown in FIG. 4, the image encoder 400 includes an intra-frame prediction module 420, a reconstruction image buffer 440, an entropy encoding module 450, a subtracter 410 and an adder 430. Those skilled in the art would appreciate that the structure shown in FIG. 4 is not exclusive; to the contrast, the encoder may further include other components additionally such as a frame buffer.

Each image inputted is processed by taking a pixel as a unit. Image data is coupled to the intra-frame prediction module 420.

The intra-frame prediction module uses an intra-frame pixel prediction method, e.g. described in combination with FIG. 1 to generate prediction of pixel to be encoded. Prediction in a path 402 from the intra-frame prediction module 420 is subtracted from the pixel to be encoded currently from a path 401 by the subtracter 410 so as to form a residual signal in a path 403. The residual signal in the path 403 is transferred to the entropy encoding module 450 for encoding, e.g. performing LZMA encoding. It should be noted that the residual signal may be alternatively transformed and quantified in the path 403 (not shown in FIG. 4).

The residual signal in the path 403 is further transferred to the adder 430 through a path 404 so as to reconstruct the pixel. Corresponding to the processing on 403, contrary processing may be performed in the path 404. For instance, if transformation and quantification are performed on the 403, inverse transformation and inverse quantification shall be performed on the path 404. Encoding in case where there is no transformation and quantification is called as lossless encoding.

The adder 430 adds a prediction value from the intra-frame prediction module 420 to the residual signal from the path 404 to obtain a reconstructed pixel that will be stored in the reconstruction image buffer 440.

The reconstruction image buffer 440 is coupled to the intra-frame prediction module 420 so that the intra-frame prediction module 420 uses previously reconstructed pixel regions to build prediction of the pixel which is being encoded currently.

III. A Second Embodiment of an Image Encoder

All the traditional encoding methods conduct prediction by taking a block as a unit. One cause of such traditional block prediction is: traditional encoding technologies are of a block encoding mode, where both of transformation and quantification for example are conducted by taking a block as a unit; if traditional encoding technologies directly take a pixel point as a prediction unit (a template matching unit), there will be a problem of error diffusion. Assuming that the point in the upper left corner is (0, 0), points (1, 1), (2, 2) or a point that is far away from the left side and the top must use points that have been predicted such as point (0, 0) for template matching. However, there is a certain chance of prediction error for each point, and thus the error will gradually diffuse, so traditional methods cannot conduct a prediction by taking a point as a unit but taking a block as a unit.

In order to use the prediction method by taking a pixel as a unit according to embodiments of the present invention in combination with traditional transformation, quantification and encoding technologies of taking a block as a unit and overcome the problem of prediction error diffusion simultaneously, embodiments of the present invention below design technologies of rearranging (or reorganizing) pixels for the original image, dividing the rearranged image into blocks, and conducting template matching and prediction by taking a pixel as a unit and conducting transformation, quantification and encoding by taking a block as a unit for pixels in the blocks in the original image.

FIG. 5 shows an exemplary configuration block diagram of an image encoder 500 according to an embodiment of the present invention.

As shown in FIG. 5, the image encoder 500 may include a pixel rearranging module 550, a predictor 520, a subtracter 510, a transformation module and/or a quantification module 513, entropy encoder 530, inverse transformation/inverse quantification module 560, an adder 570, a deblocking module 580, a sample adaptive offset (SAO) module 590, and a reconstruction image buffer 540.

Input video data is coupled to the pixel rearranging module 550 through a path 501, and it is rearranged (reorganized) in the pixel rearranging module 550 and divided into blocks. Video data after being divided into blocks is coupled to the predictor 520. In an example, the pixel rearranging module 550 rearranges pixels and divides the pixels into blocks to obtain respective blocks as encoding targets, such that a plurality of pixels in divided blocks do not appear in original blocks in frames before the rearranging simultaneously as much as possible, and such that when a pixel in a divided block is being predicted, pixels in its target template in the frame before the rearranging have been reconstructed as much as possible. In an example, blocks of different sizes exist in the divided blocks by the pixel rearranging module 550; preferably, the pixel rearranging module 550 makes sizes of the divided blocks be the size of a block in a concrete encoding standard as much as possible. Below, functions and operations of the pixel rearranging module 550 will be described in detail in conjunction with examples. The predictor 520 may include an inter-frame prediction module 521 and an intra-frame prediction module 522. The inter-frame prediction module 521 may perform a motion estimation (ME) operation and a motion compensation (MC) operation. For each pixel in a block to be encoded currently that after rearrangement, the intra-frame prediction module 522 conducts operations such as target template defining, template matching and prediction value determining by taking a pixel as a unit in conjunction with description on FIGS. 1, 2 and 3. The predictor 520 uses pictures decoded previously stored in the reconstruction image buffer 540 to build estimation of the current picture being encoded.

Generally, an encoding form may be selected prior to the prediction. There are various kinds of different encoding forms. Such encoding forms are grouped into two categories, i.e., inter-frame encoding and intra-frame encoding. In the embodiments of the present invention, intra-frame encoding relates to encoding blocks and macro-blocks in pictures after rearranging by using intra-frame prediction, wherein intra-frame prediction is being conduct through the use of template matching by taking a pixel as a unit in pictures before the rearranging. Such prediction on each pixel in the block forms prediction on the block. It should be noted that traditional intra-frame prediction technologies generally conduct template defining and template matching by taking a block as a unit, as mentioned above.

After the predictor 520 obtains prediction of blocks after the rearranging, prediction in a path 502 is subtracted by the subtracter 510 from the blocks after the rearranging to form a residual signal, and the residual signal is transferred to the transformation/quantification module 513 for encoding.

The transformation/quantification module 513 subsequently uses transformation and/or quantification operations. The transformation operation is for instance a transformation for example based on Discrete Cosine Transformation (DCT), and the quantification operation is to quantify coefficients after the transformation.

The generated quantified coefficients after the transformation are inverse quantification and inverse transformation operated in the inverse quantification/inverse transformation module 560 to obtain a decoded residual, then the decoded residual is added to the prediction from the predictor 520 in the adder 570, and thus reconstructed image data is obtained. In the present embodiment, reconstructed blocks are further subjected to processing of minimizing of block effect in a deblocking filter 580. The reconstructed image after the deblocking processing after a sample adaptive offset in the sample adaptive offset module 590 is stored in the reconstruction image buffer 540 for the predictor 520 to conduct inter-frame prediction and/or intra-frame prediction. The quantified coefficients after the transformation from the transformation/quantification module 513 are further transferred to the entropy encoder 530. An entropy encoder 180 may perform encoding algorithms such as nonzero residual adaptive encoding, Context-based Adaptive Variable Length Coding (CAVLC) or Context-based Adaptive Binary Arithmetic Coding (CABAC). Encoded data stream, after being rate-controlled and buffered for example, is transmitted to the decoder side.

IV. An Example of a Pixel Rearranging Method

As stated above, the pixel rearranging module 550 may rearrange pixels and divid pixels into blocks to obtain respective blocks as encoding targets, such that a plurality of pixels in a divided block do not appear in a same original block in the frame before the rearranging simultaneously as much as possible, and such that when a pixel in a divided block is being predicted, the pixels in its target template in the frame before the rearranging have been reconstructed as much as possible. By that a plurality of pixels in a divided block do not appear in a same original block in the frame before the rearranging simultaneously as much as possible, it may avoid from error diffusion in the pixel prediction process. By that when a pixel in a divided block is being predicted, the pixels in its target template in the frame before the rearranging have been reconstructed as much as possible, it may improve accuracy rate of the pixel prediction. In an example, blocks of different sizes exist in the blocks obtained after the dividing pixels into blocks operation by the pixel rearranging module 550; preferably, the pixel rearranging module makes sizes of the divided blocks be the size of a block in a concrete encoding standard as much as possible.

Below, an exemplary pixel rearranging method performed by the pixel rearranging module 550 is described in detail.

In an example, different pixel rearranging algorithms are used according to whether size of an image is an integral multiple of an encoded block.

1. As for a case where size of an image is an integral multiple of an encoded block Suppose that size of an image is M×N, and size of an encoded block is T×T, M and N being integral multiples of T, wherein M denotes number of rows in the image and N denotes number of columns in the image, pixel row at the top of the image being called as row 0 and pixel column on the leftmost side of the image being called as column 0, wherein $P_{i,j}$ denotes a pixel point which is located in row i and column j in the image, where $0 \le i \le M-1$, $0 \le i \le N-1$, and M, N and T are positive integers greater than 1, and Suppose that pixel point $R_{p,q}$ in row p and column q after the reorganizing corresponds to the pixel point $P_{i,j}$ before the reorganizing, where $0 \le p \le M-1$, $0 \le q \le N-1$.

In an example, formulas for calculating i,j are respectively Formulas (1) and (2):

$$i=(p \bmod T) \times (M/T) + \text{rounddown}(p/T) \qquad (1)$$

$$j=(q \bmod T) \times (N/T) + \text{rounddown}(q/T) \qquad (2)$$

where mod denotes a modulo operation, × denotes a multiply operation, and rounddown( ) denotes a round down operation.

For instance, taking an image where M=12, N=16 and T=4 as an example, (a) and (b) in FIG. 6 show image examples before and after the pixel rearranging, wherein (a) in FIG. 6 is an original image and each small block denotes a pixel point, and wherein different pixel points are marked with different gray scales and mark numbers indicated with lower-case letters; and (b) in FIG. 6 is a new image after the image is reorganized, wherein pixel points with the same gray scale and mark number will constitute 12 4×4 image blocks after being reorganized.

2. As for a case where size of an image is not an integral multiple of an encoded block Suppose that size of an image is M×N, and size of an encoded block is T×T, values of M and N being not integral multiples of T, wherein M denotes number of rows in the image and N denotes number of columns in the image, pixel row at the top of the image being called as row 0 and pixel column on the leftmost side of the image being called as column 0, wherein $P_{i,j}$ denotes a pixel point which is located in row i and column j in the image, where $0 \le i \le M-1$, $0 \le i \le N-1$, and M, N and T are positive integers greater than 1;

Suppose that pixel point $R_{p,q}$ in row p and column q after the reorganizing corresponds to the pixel point $P_{i,j}$ before the reorganizing, size of the image after the reorganizing is $((\text{rounddown}(M/T)+1) \times T) \times ((\text{rounddown}(N/T)+1) \times T)$, where $(\text{rounddown}(M/T)+1) \times T$ denotes number of rows in the image after the reorganizing, $(\text{rounddown}(N/T)+1) \times T$ denotes number of columns in the image after the reorganizing, $0 \le p \le (\text{rounddown}(M/T)+1) \times T - 1$ and $0 \le q \le (\text{rounddown}(N/T)+1) \times T - 1$, pixel point $R_{p,q}$ in the image after the reorganizing corresponds to the pixel point $P_{i,j}$ in the image before the reorganizing, wherein formulas for calculating i,j are (3)-(8) as follow:

$$i=(p \bmod T) \times (\text{rounddown}(M/T)+1) + \text{rounddown}(p/T)$$
$$\text{when } (p \bmod T) < (M \bmod T), \qquad (3)$$

$$i=(M \bmod T) \times (\text{rounddown}(M/T)+1) + ((p \bmod T) - (M \bmod T)) \times \text{rounddown}(M/T) + \text{rounddown}(p/T)$$
$$\text{when } (p \bmod T) >= (M \bmod T) \text{ and } p < M, \qquad (4)$$

$i$ does not have a valid value, where $R_{p,q}=0$, when $p >= M,$ (5)

wherein formulas for calculating j are:

$$j=(q \bmod T) \times (\text{rounddown}(N/T)+1) + \text{rounddown}(q/T)$$
$$\text{when } (q \bmod T) < (N \bmod T), \qquad (6)$$

$$j=(N \bmod T) \times (\text{rounddown}(N/T)+1) + ((q \bmod T) - (N \bmod T)) \times \text{rounddown}(N/T) + \text{rounddown}(q/T)$$
$$\text{when } (q \bmod T) >= (N \bmod T) \text{ and } q < N, \qquad (7)$$

$j$ does not have a valid value, where $R_{p,q}=0$, when $q >= N.$ (8)

For instance, taking an image where M=18, N=13 and T=4 as an example, (a) and (b) in FIG. 7 respectively show image examples before and after the pixel rearranging, wherein (a) in FIG. 7 is an original image and each small block denotes a pixel point, wherein different pixel points are marked with different gray scales and mark numbers indicated with lower-case letters; and (b) in FIG. 7 is a new image after the image is reorganized, wherein pixel points with the same gray scale and mark number will constitute 20 4×4 image blocks after being reorganized, and wherein blank pixel points indicate invalid pixel points. In an example, encoding algorithms generally take these residuals located at invalid pixel point positions as 0 for encoding.

Below, another exemplary pixel rearranging method in a case where size of an image is not an integral multiple of an encoded block will be illustrated. Suppose that size of an image is M×N, and size of an encoded block is T×T, values of M and N being not integral multiples of T, wherein M denotes number of rows in the image and N denotes number of columns in the image, pixel row at the top of the image being called as row 0 and pixel column on the leftmost side of the image being called as column 0, wherein $P_{i,j}$ denotes a pixel point which is located in row i and column j in the image, where $0 \le i \le M-1$, $0 \le i \le N-1$, and M, N and T are positive integers greater than 1;

Suppose that pixel point $R_{p,q}$ in row p and column q after the reorganizing corresponds to the pixel point $P_{i,j}$ before the reorganizing, size of the image after the reorganizing is ((rounddown(M/T)+1)×T)×((rounddown(N/T)+1)×T), where (rounddown(M/T)+1)×T denotes number of rows in the image after the reorganizing, (rounddown(N/T)+1)×T denotes number of columns in the image after the reorganizing, 0≤p≤(rounddown(M/T)+1)×T and 0≤q≤(rounddown(N/T)+1)×T, pixel point $R_{p,q}$ in the image after the reorganizing corresponds to the pixel point $P_{i,j}$ in the image before the reorganizing, wherein formulas for calculating i,j are (9)-(14) as follow:

$$i=(p \bmod T)\times(\text{rounddown}(M/T)+1)+\text{rounddown}(p/T) \text{ when } (p \bmod T)<(M \bmod T), \quad (9)$$

$$i=(M \bmod T)\times(\text{rounddown}(M/T)+1)+((p \bmod T)-(M \bmod T))\times \text{rounddown}(M/T)+\text{rounddown}(p/T) \text{ when } (p \bmod T)>=(M \bmod T) \text{ and } p<M, \quad (10)$$

$i$ does not have a valid value, where $R_{p,q}=0$, when $p>=M$, \quad (11)

wherein formulas for calculating j are:

$$j=(q \bmod T)\times(\text{rounddown}(N/T)+1)+\text{rounddown}(q/T) \text{ when } (q \bmod T)<(N \bmod T), \quad (12)$$

$$j=(N \bmod T)\times(\text{rounddown}(N/T)+1)+((q \bmod T)-(N \bmod T))\times \text{rounddown}(N/T)+\text{rounddown}(q/T) \text{ when } (q \bmod T)>=(N \bmod T) \text{ and } q<N, \quad (13)$$

$j$ does not have a valid value, where $R_{p,q}=0$, when $q>=N$, \quad (14)

where mod denotes a modulo operation, × denotes a multiply operation, and rounddown( ) denotes a round down operation.

For instance, taking an image where M=18, N=13 and T=4 as an example, (a) and (b) in FIG. 8 show images before and after the pixel rearranging, wherein (a) in FIG. 8 is an original image and each small block denotes a pixel point, wherein different pixel points are marked with different gray scales and mark numbers indicated with lower-case letters; and (b) in FIG. 8 is a new image after the image is reorganized, wherein pixel points with the same gray scale and mark number will constitute 20 4×4 image blocks after being reorganized, and wherein blank pixel points indicate invalid pixel points. In an example, encoding algorithms take these residuals located at invalid pixel point positions as 0 for encoding.

As for the case where size of an image is not an integral multiple of T, the pixel rearranging methods as shown by (a) and (b) of FIG. 7 and (a) and (b) of FIG. 8 are only examples, there may further be other pixel point reorganizing solutions that meet the following characteristics, whose general principle is that a plurality of pixels in a block obtained after dividing the pixels into blocks do not appear in an original block in the frame before the rearranging simultaneously as much as possible, and that when a pixel in the divided block being predicted, pixels in its target template in the frame before the rearranging have been reconstructed as much as possible; furthermore, size of the image after the reorganizing is ((rounddown(M/T)+1)×T)×((rounddown(N/T)+1)×T).

V. An Embodiment of an Image Encoding Method

FIG. 9 shows a flow chart of an exemplary image encoding method according to an embodiment of the present invention.

As shown by FIG. 9, in step S910, a target template of a pixel to be predicted currently is defined, and then it proceeds to step S920.

In step S920, the target template is compared with candidate templates in a search region of the frame, and at least one matching template, from the candidate templates, matching the target template is determined, and then it proceeds to step S930.

In step S930, a prediction value of the pixel to be predicted currently is determined based on the at least one matching template, and then it proceeds to step S940.

In step S940, the pixel to be predicted currently or the block to which the pixel to be predicted currently belongs is encoded based on the prediction value of the pixel to be predicted currently.

Concrete operations of the steps S910, S920 and S930 may refer to the steps S110, S120 and S130 described in conjunction with FIG. 1.

Encoding operation of the step S940 may refer to the functions and operations of the encoder described in conjunction with FIG. 4 and the encoder described in conjunction with FIG. 5.

In an example, the encoding method may further comprise: a step of reorganizing pixels and dividing the pixels into blocks, wherein rearranging pixels and dividing the pixels into blocks s, obtaining respective blocks as encoding targets so that a plurality of pixels in a divided block do not appear in a same original block in the frame before the rearranging simultaneously as much as possible, and so that when a pixel in a divided block is being predicted, pixels in its target template in the frame before the rearranging have been reconstructed as much as possible; and as for a block to be encoded currently: as for each pixel in the block, conducting the above mentioned step of defining a target template, step of determining a matching template and step of determining a prediction value in the frame before the rearranging, thereby obtaining a prediction value of each pixel so as to obtain a prediction block of the block to be encoded currently; and encoding the block to be encoded currently by using the prediction block of the block to be encoded currently.

VI. An Embodiment of an Image Decoding Method

FIG. 10 shows a flow chart of an exemplary decoding method 1000 for image frame decoding according to an embodiment of the present invention.

The decoding method may be deemed as an inverse operation to the encoding method.

As shown in FIG. 10, in step S1010, an encoded representation of an image block is received, the image block being formed by pixels after rearranging pixels and dividing the pixels into blocks in an image before being encoded, and then it proceeds to step S1020.

In step S1020, a prediction block of the image block is obtained, and then it proceeds to step S1030. Step S1020 comprises conducting prediction for each pixel in the image block by the following steps: in step S1021, a target template of the pixel is determined, and then it proceeds to step S1022. In step S1022, the target template is compared with candidate templates in a search region of the frame, and at least one matching template, from the candidate templates, matching the target template is determined. In step S1023, a prediction value of the pixel to be predicted currently is determined based on the at least one matching template.

In step S1030, respective pixel values of the image block are obtained based on a prediction block of the image block and an encoded representation of the image block. As stated above, the encoded representation is a residual of the blocks after the rearranging. A decoded pixel value is obtained by adding the prediction block and the residual of the block.

Determining a target template of the pixel in step S1022 may comprise: determining an initial position of the pixel in an original image; and determining the target template of the pixel based on reconstructed pixels around the initial position.

The search region may be a region on the upper left side of the pixel to be predicted currently of the frame.

It should be noted that respective components of the image encoder of the first embodiment (described in conjunction with FIG. 4) and the image encoder illustrated by the second embodiment (described in conjunction with FIG. 5) may be realized by software programs, e.g. realized through combination of a CPU in a general-purpose computer with an RAM, an ROM and software codes running in the CPU. The software programs may be stored in a storage medium such as a flash memory, a soft disk, a hard disk or an optical disk, and are loaded to the random access memory (RAM) during running and executed by the CPU. In addition, besides the general-purpose computer, they may also be realized through the cooperation between an application-specific integrated circuit and software. The integrated circuit is realized through at least one of an MPU (micro processing unit), a DSP (digital signal processor), an FPGA (field-programmable gate array), an ASIC (application-specific integrated circuit) and the like. In addition, each component of the image encoders may be realized by special hardware, e.g. a specific Field Programmable Gate Array, an Application-Specific Integrated Circuit and the like. In addition, each component of the image encoders may further be realized via the combination of software and hardware.

The structure and number of each component of the image encoders do not limit the scope of the present invention. According to an embodiment of the present invention, the components may be combined into an independent component to execute and realize corresponding functions and operations, or each component is further split into smaller units to realize their respective functions and operations.

The embodiments of the present disclosure are described above, and the foregoing descriptions are exemplary rather than exhaustive and are not limited to the disclosed embodiments. Many modifications and alterations are obvious to those ordinary skilled in the art without departing from the scope and spirit of each described embodiment. Accordingly, the protection scope of the claims should prevail over the protection scope of the present disclosure.

The invention claimed is:

1. An intra-frame pixel prediction method for predicting a pixel in an image frame, comprising:
   a step of defining a target template, defining a target template of a pixel to be predicted currently;
   a step of determining a matching template, comparing the target template with candidate templates in a search region of the frame, and determining, from the candidate templates, at least one matching template matching the target template; and
   a step of determining a prediction value, determining a prediction value of the pixel to be predicted currently based on the at least one matching template;
   the intra-frame pixel prediction method further comprising:
   rearranging pixels and dividing the pixels into blocks, obtaining respective blocks as encoding targets so that a plurality of pixels in a divided block after the rearranging and dividing of the pixels into blocks do not appear in an original block in the frame before the rearranging and dividing of the pixels into blocks, and so that when a pixel in a divided block is being predicted, a plurality of pixels in its target template in the frame before the rearranging have been reconstructed.

2. The intra-frame pixel prediction method of claim 1, wherein the target template of the pixel to be predicted currently is formed of pixels located on the left side and upper side of the pixel to be predicted currently.

3. The intra-frame pixel prediction method of claim 2, further comprising setting unreconstructed pixels in the target template as invalid pixels, and
   the step of determining a matching template comprising:
   determining matching degree between the target template and the candidate templates based on reconstructed pixels in the target template and reconstructed pixels in the candidate templates; and
   selecting one or more whose matching degree is the highest as the at least one matching template.

4. The intra-frame pixel prediction method of claim 1, wherein determining a prediction value of the pixel to be predicted currently based on the at least one matching template comprises:
   according to relative position relationship between the pixel to be predicted currently and the target template thereof, obtaining a reference pixel that has the relative position relationship with the matching template; and
   based on the matching template and reference pixel or based on the reference pixel, determining a prediction value of the pixel to be predicted currently.

5. The intra-frame pixel prediction method of claim 1, further comprising:
   taking a difference between a value of the pixel to be predicted currently and the prediction value of the pixel to be predicted currently as a prediction residual;
   encoding the prediction residual to send the encoded prediction residual to the decoder side; and
   decoding the encoded prediction residual on the encoder side and adding the decoded residual to the prediction value of the pixel to be predicted to obtain a reconstructed value of the pixel at a corresponding position.

6. An encoding method for conducting intra-frame encoding for an image frame, comprising:
   a step of reorganizing pixels and dividing the pixels into blocks, wherein rearranging pixels and dividing the pixels into blocks, obtaining respective blocks as encoding targets so that a plurality of pixels in a divided block after the rearranging and dividing of the pixels into blocks do not appear in an original block in the frame before the rearranging and dividing of the pixels into blocks, and so that when a pixel in a divided block is being predicted, a plurality of pixels in its target template in the frame before the rearranging have been reconstructed; and
   as for a block to be encoded currently:
   with a pixel as a unit, conducting prediction for each pixel in the block, thereby obtaining a prediction value of each pixel so as to obtain a prediction block of the block to be encoded currently; and
   encoding the block to be encoded currently by using the prediction block of the block to be encoded currently.

7. The encoding method according to claim 6, said with pixel as unit, conducting prediction for each pixel in the block, thereby obtaining a prediction value of each pixel comprising:
   as for each pixel in the block, conducting a step of defining a target template, a step of determining a matching template and a step of determining a prediction value in frames before the rearranging, wherein:

the step of defining a target template, defining a target template of a pixel to be predicted currently;

the step of determining a matching template, comparing the target template with candidate templates in a search region of the frame, and determining, from the candidate templates, at least one matching template matching the target template; and the step of determining a prediction value, determining a prediction value of the pixel to be predicted currently based on the at least one matching template.

8. The encoding method of claim 6, wherein encoding the block to be encoded currently by using the prediction block of the block to be encoded currently comprises obtaining a residual block, quantizing a residual block, and entropy-coding the quantized residual block.

9. The encoding method of claim 6, wherein blocks of different sizes exist in the divided blocks.

10. The encoding method of claim 9, wherein the step of reorganizing pixels and dividing the pixels into blocks makes a plurality of the sizes of the divided blocks be sizes of blocks in a concrete encoding standard.

11. The encoding method of claim 6, wherein size of an image is M×N, and size of an encoded block is T×T, M and N being integral multiples of T, wherein M denotes number of rows in the image and N denotes number of columns in the image, a pixel row at the top of the image being called as row 0 and a pixel column on the leftmost side of the image being called as column 0, wherein $P_{i,j}$ denotes a pixel point which is located in row i and column j in the image, where $0 \leq i \leq M-1$, $0 \leq i \leq N-1$, and M, N and T are positive integers greater than 1, and pixel point $R_{p,q}$ in row p and column q after the reorganizing corresponds to the pixel point $P_{i,j}$ before the reorganizing, where $0 \leq p \leq M-1$, $0 \leq q \leq N-1$, wherein formulas for calculating i,j are respectively formulas (1) and (2):

$$i = (p \bmod T) \times (M/T) + \mathrm{rounddown}(p/T) \tag{1}$$

$$j = (q \bmod T) \times (N/T) + \mathrm{rounddown}(q/T) \tag{2}$$

where mod denotes a modulo operation, × denotes a multiply operation, and rounddown( ) denotes a round down operation.

12. The encoding method of claim 6, wherein size of an image is M×N, and size of an encoded block is T×T, values of M and N being not integral multiples of T, wherein M denotes number of rows in the image and N denotes number of columns in the image, a pixel row at the top of the image being called as row 0 and a pixel column on the leftmost side of the image being called as column 0, wherein $P_{i,j}$ denotes a pixel point which is located in row i and column j in the image, where $0 \leq i \leq M-1$, $0 \leq i \leq N-1$, and M, N and T are positive integers greater than 1;

pixel point $R_{p,q}$ in row p and column q after the reorganizing corresponds to the pixel point $P_{i,j}$ before the reorganizing, size of the image after the reorganizing is $((\mathrm{rounddown}(M/T)+1) \times T) \times ((\mathrm{rounddown}(N/T)+1) \times T)$, where $(\mathrm{rounddown}(M/T)+1) \times T$ denotes number of rows in the image after the reorganizing, $(\mathrm{rounddown}(N/T)+1) \times T$ denotes number of columns in the image after the reorganizing, $0 \leq p \leq (\mathrm{rounddown}(M/T)+1) \times T-1$ and $0 \leq q \leq (\mathrm{rounddown}(N/T)+1) \times T-1$, pixel point $R_{p,q}$ in the image after the reorganizing corresponds to the pixel point $P_{i,j}$ in the image before the reorganizing, wherein formulas for calculating i,j are:

$$i = (p \bmod T) \times (\mathrm{rounddown}(M/T)+1) + \mathrm{rounddown}(p/T)$$
$$\text{when } (p \bmod T) < (M \bmod T), \tag{3}$$

$$i = (M \bmod T) \times (\mathrm{rounddown}(M/T)+1) + ((p \bmod T) - (M \bmod T)) \times \mathrm{rounddown}(M/T) + \mathrm{rounddown}(p/T)$$
$$\text{when } (p \bmod T)(M \bmod T) \text{ and } p < M, \tag{4}$$

$i$ does not have a valid value, where $R_{p,q} = 0$, when $p \geq M$, $\tag{5}$ wherein formulas for calculating j are:

$$j = (q \bmod T) \times (\mathrm{rounddown}(N/T)+1) + \mathrm{rounddown}(q/T)$$
$$\text{when } (q \bmod T) < (N \bmod T), \tag{6}$$

$$j = (N \bmod T) \times (\mathrm{rounddown}(N/T)+1) + ((q \bmod T) - (N \bmod T)) \times \mathrm{rounddown}(N/T) + \mathrm{rounddown}(q/T)$$
$$\text{when } (q \bmod T) \geq (N \bmod T) \text{ and } q < N, \tag{7}$$

$j$ does not have a valid value, where $R_{p,q} = 0$, when $q \geq N$. $\tag{8}$ 13. The encoding method of claim 6, wherein size of an image is M×N, and size of an encoded block is T×T, values of M and N being not integral multiples of T, wherein M denotes number of rows in the image and N denotes number of columns in the image, a pixel row at the top of the image being called as row 0 and a pixel column on the leftmost side of the image being called as column 0, wherein $P_{i,j}$ denotes a pixel point which is located in row i and column j in the image, where $0 \leq i \leq M-1$, $0 \leq i \leq N-1$, and M, N and T are positive integers greater than 1;

pixel point $R_{p,q}$ in row p and column q after the reorganizing corresponds to the pixel point $P_{i,j}$ before the reorganizing, size of the image after the reorganizing is $((\mathrm{rounddown}(M/T)+1) \times T) \times ((\mathrm{rounddown}(N/T)+1) \times T)$, where $(\mathrm{rounddown}(M/T)+1) \times T$ denotes number of rows in the image after the reorganizing, $(\mathrm{rounddown}(N/T)+1) \times T$ denotes number of columns in the image after the reorganizing, $0 \leq p \leq (\mathrm{rounddown}(M/T)+1) \times T$ and $0 \leq q \leq (\mathrm{rounddown}(N/T)+1) \times T$, pixel point $R_{p,q}$ in the image after the reorganizing corresponds to the pixel point $P_{i,j}$ in the image before the reorganizing, wherein formulas for calculating i,j are:

$$i = (p \bmod T) \times (\mathrm{rounddown}(M/T)+1) + \mathrm{rounddown}(p/T)$$
$$\text{when } (p \bmod T) < (M \bmod T), \tag{9}$$

$$i = (M \bmod T) \times (\mathrm{rounddown}(M/T)+1) + ((p \bmod T) - (M \bmod T)) \times \mathrm{rounddown}(M/T) + \mathrm{rounddown}(p/T)$$
$$\text{when } (p \bmod T) \geq (M \bmod T) \text{ and } p < M, \tag{10}$$

$i$ does not have a valid value, where $R_{p,q} = 0$, when $p \geq M$, $\tag{11}$ wherein formulas for calculating j are:

$$j = (q \bmod T) \times (\mathrm{rounddown}(N/T)+1) + \mathrm{rounddown}(q/T)$$
$$\text{when } (q \bmod T) < (N \bmod T), \tag{12}$$

$$j = (N \bmod T) \times (\mathrm{rounddown}(N/T)+1) + ((q \bmod T) - (N \bmod T)) \times \mathrm{rounddown}(N/T) + \mathrm{rounddown}(q/T)$$
$$\text{when } (q \bmod T) \geq (N \bmod T) \text{ and } q < N, \tag{13}$$

$j$ does not have a valid value, where $R_{p,q} = 0$, when $q \geq N$, $\tag{14}$ where mod denotes a modulo operation, × denotes a multiply operation, and rounddown( ) denotes a round down operation.

14. A decoding method for decoding an image frame, comprising:

receiving an encoded representation of an image block, the image block being formed by pixels in an image before being encoded after rearranging pixels and dividing the pixels into blocks, by obtaining respective blocks as encoding targets so that a plurality of pixels in a divided block after the rearranging and dividing of the pixels into blocks do not appear in an original block in the frame before the rearranging and dividing the pixels into blocks, and so that when a pixel in a divided block is being predicted, a plurality of pixels in its target in the frame before the rearranging have been reconstructed;

obtaining a prediction block of the image block, comprising conducting prediction for each pixel in the image block by the following steps:
  determining a target template of the pixel;
  comparing the target template with candidate templates in a search region of the frame, and determining, from the candidate templates, at least one matching template matching the target template;
  determining a prediction value of the pixel to be predicted currently based on the at least one matching template, and obtaining respective pixel values of the image block based on a prediction block of the image block and an encoded representation of the image block.

15. The decoding method of claim 14, wherein determining a target template of the pixel comprises:
  determining an initial position of the pixel in an original image; and
  determining the target template of the pixel based on reconstructed pixels around the initial position.

16. The decoding method of claim 15, wherein the search region is a region on the upper left side of the pixel to be predicted currently of the frame.

17. An intra-frame pixel prediction device for predicting pixels in an image frame, comprising:
  means for reorganizing pixels and dividing the pixels into blocks, which is for rearranging pixels and dividing the pixels into blocks, obtaining respective blocks as encoding targets so that a plurality of pixels in a divided block after the rearranging and dividing of the pixels into blocks do not appear in an original block in the frame before the rearranging and dividing of the pixels into blocks, and so that when a pixel in a divided block is being predicted, a plurality pixels in its target template in the frame before the rearranging have been reconstructed; and means for predicting, which is for as for a block to be encoded currently:
    with pixel as unit, conducting prediction for each pixel in the block, thereby obtaining a prediction value of each pixel so as to obtain a prediction block of the block to be encoded currently; and
  encoding the block to be encoded currently by using the prediction block of the block to be encoded currently.

18. The intra-frame pixel prediction device of claim 17, wherein the device is used for encoding the screen content.

* * * * *